United States Patent [19]

Karanian et al.

[11] Patent Number: 5,351,125
[45] Date of Patent: Sep. 27, 1994

[54] GAGING FINGER FOR PRECISION MEASURING INSTRUMENTS

[75] Inventors: Ralph E. Karanian, Wethersfield; Stephen R. Noonan, Glastonbury; John M. Vecchitto, Portland, all of Conn.

[73] Assignee: Moore Products, Inc., Plainville, Conn.

[21] Appl. No.: 38,013

[22] Filed: Mar. 29, 1993

[51] Int. Cl.$^5$ .............................................. G01B 11/10
[52] U.S. Cl. ................................... 356/357; 356/358; 33/DIG. 4
[58] Field of Search .................. 356/357, 358; 33/DIG. 4, DIG. 21

[56] References Cited

U.S. PATENT DOCUMENTS

| | | | |
|---|---|---|---|
| Re. 33,774 | 12/1991 | Gurny | 33/503 |
| 3,749,500 | 7/1973 | Carlson et al. | 356/357 |
| 3,779,647 | 12/1973 | Dawson | 356/358 |
| 4,347,441 | 8/1982 | Dil et al. | 356/358 |
| 4,417,816 | 11/1983 | Kindl et al. | 356/357 |
| 4,509,858 | 4/1985 | Smythe et al. | 356/358 |
| 4,538,911 | 9/1985 | Heynacher et al. | 356/358 |
| 4,561,190 | 12/1985 | Yamamoto et al. | 33/561 |

*Primary Examiner*—Rolf Hille
*Assistant Examiner*—Minhloan Tran
*Attorney, Agent, or Firm*—CHilton, Alix & Van Kirk

[57] ABSTRACT

Spherical workpiece contact elements on a gaging finger of a linear measurement interferometer are positioned and supported by the establishment of four points of contact therewith. The spherical contact elements are located in a V-shaped groove, which defines two of the contact points, and are accessible for replacement by removal of a cap which establishes a third contact point with each spherical contact element. The fourth point of contact defines the position along the length of the V-groove of the contact elements and thus defines the degree of protrusion of the contact elements beyond the periphery of the supporting portion of the gaging finger.

16 Claims, 1 Drawing Sheet

GAGING FINGER FOR PRECISION MEASURING INSTRUMENTS

BACKGROUND OF THE INVENTION

1. Field of the Invention

The present invention relates to the precise measurement of physical objects and particularly to facilitating the maintenance, and thereby insuring the continued accuracy, of precision linear measuring instruments such as interferometers. More specifically, this invention is directed to guage fingers for use on precision measuring instruments and particularly to guage finger which include a field replaceable contact element which may be in the form of a jewel bearing. Accordingly, the general objects of the present invention are to provide novel and improved methods and apparatus of such character.

2. Description of the Prior Art

While not limited thereto in its utility, the present invention is particularly well suited for use as a gaging finger of a linear measurement interferometer. Such a measuring instrument is generally described in U.S. Pa. No. 4,509,858 and includes a probe, schematically indicated at 15, having a contact end 18 which is brought into engagement with the workpiece to be measured. In accordance with the prior art, the workpiece contacting member, i.e., the gaging finger, of a linear measurement instrument has customarily been constructed generally along the lines of gage arm 42 depicted in FIGS. 4 and 5 of U.S. Pat. No. 4,417,816. In the latter patent, the gage arm is provided with a pair of oppositely disposed tips or contact elements 44 and 46 one of which will be brought into abuttment with the workpiece during a measurement procedure, the tip which actually engages the workpiece being determined by whether an internal or external measurement of the workpiece is being made. The "tips" of the gage arm of previous linear measurement instruments have employed flat, cylindrical or spherical contact surfaces which were comprised of a wear resistant material such as diamond, ruby, carbide or hardened steel.

In order to maintain the accuracy of a linear measurment instrument, an interferometer for example, periodic replacement of the workpiece engaging elements has been required since these elements are subjected to wear as a result of their contact with the workpiece surface. Such replacement has often previously required replacement of the entire gaging finger subassembly, this being particularly true in the case of gaging fingers which could be employed to perform internal measurements. When the instrument is employed to make external measurements and employs spherical contacts, it has been common practice to replace the gage tip as a subassembly. In either event, in accordance with the prior art, the instrument operator was either required to have extra contact point or gaging finger subassemblies on hand or to remove the gaging finger from the measuring instrument and return it to the manufacturer for rework. The first option obviously requires that the instrument operator incur the added cost of having extra finger or contact point subassemblies on hand. The second option obviously imposes the significant disadvantage of rendering the measurement instrument unusable during time periods when the gaging fingers are being reworked.

SUMMARY OF THE INVENTION

The present invention overcomes the above-briefly discussed and other deficiencies and disadvantages of the prior art and, in so doing, provides a technique whereby the contact elements of a gaging finger of a linear measurement instrument may be replaced in the field thereby avoiding the replacement of the entire gaging finger and avoiding the need for factory reworking of such gaging fingers. The present invention also encompasses apparatus, particularly a novel gaging finger, for implementing this technique.

Apparatus in accordance with the invention employs spherical contact elements which function as the tips or contact points of a gaging finger. The spherical contact elements are positioned and retained on the gaging finger by establishing, in accordance with a preferred embodiment, four points of contact with the element, the element protruding beyond the periphery of the gaging finger so that it may be bought into engagement with a workpiece surface. In the preferred embodiment, one of the points of contact whereby the contact element is retained in the proper position on the gaging finger is provided by a removable cap. Removal of this cap permits the spherical contact element to be easily replaced.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE DISCLOSED EMBODIMENTS

Figures 1, 2, 3:
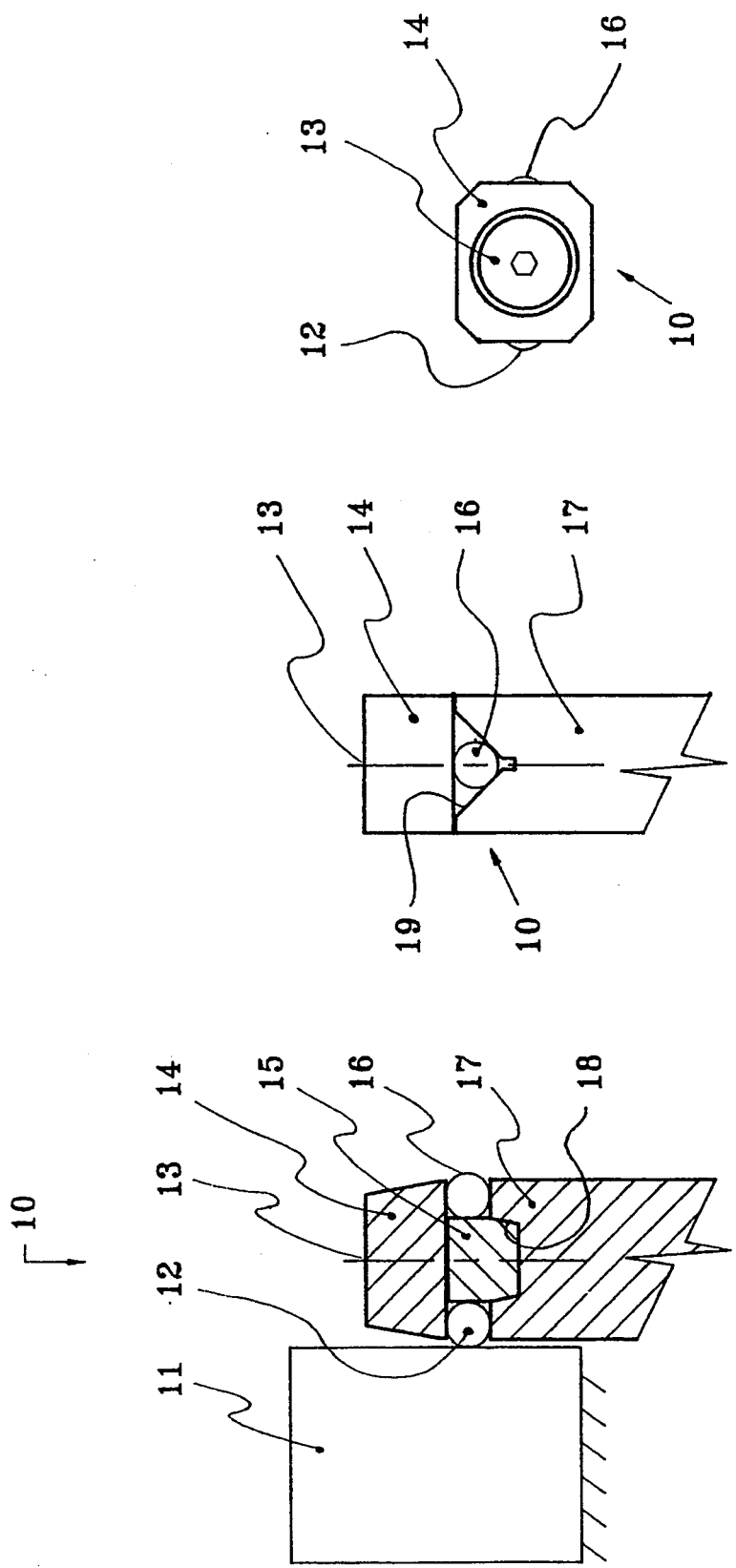
FIG. 1 is a partial, cross-sectional, side elevation view of a first embodiment of a gaging finger in accordance with the present invention.
FIG. 2 is a front elevation view, i.e., a view taken transversely and from the right side with respect to that of FIG. 1, of the gaging finger of FIG. 1.
FIG. 3 is a top view of the gaging finger of FIGS. 1 and 2.

With reference now to the drawings, a gaging finger in accordance with the present invention is indicated generally at 10. In actual practice, the gaging finger 10 will be generally L-shaped and will include a contact element support body portion 17. In the disclosed embodiment, as is customary practice, the gaging finger 10 is provided with a pair of diametrically opposed, spherical contact elements 12 and 16 which extend outwardly beyond the side(s) of the support portion 17 of the finger 10. The provision of a pair of contact elements on the gaging finger permits the finger to be employed for taking either internal or external measurements on a workpiece. In FIG. 1 a workpiece has been indicated schematically at 11. In the course of establishing engagement with the workpiece 11, the gaging finger is movable along a linear path, i.e, to the right or left as finger 10 is depicted in FIG. 1.

The spherical contacts 12, 16 may be comprised of any suitable wear resistant material as discussed above. Typically, the contact elements will be in the form of precision jeweled bearings. As may be seen by joint consideration FIGS. 1 and 2, the gaging finger body 17 is provided with a "V" groove 19 which is oriented parallelly with respect to the path of movement of the finger 10. Groove 19 centrally locates the spherical contacts 12, 16 in the direction of gaging finger travel, the side walls of the groove establishing two discrete points of contact with each of the spherical elements. Third points of contact, which determine the extension of the spherical contact elements beyond the side edges of gaging finger body 17, are defined by a spacer 15. Spacer 15 may, for example, be of cylindrical shape and received in a blind hole 18 formed in the top of gaging finger body 17. Spacer 15 extends beyond the top of finger body 17 a distance which is slightly smaller than the diameter of the spherical contact elements 12, 16.

A fourth point of contact, for retaining the spherical contact elements 12, 16 in position on the gaging finger body 17, is provided by a removable cap 14. In the disclosed embodiment, cap 14 is secured to gaging finger body 17 by means of a bolt, indicated schematically at 13 in FIGS. 1 and 2, which passes through spacer 15.

To summarize, in the disclosed embodiment the pair of oppositely disposed spherical contacts 12, 16 are precisely positioned by means of establishing three points of contact therewith, i.e., the two points of contact from the sidewalls of the V groove in body 17 and the point of contact with the spacer 15. Additionally, the spherical contact elements are securely held in position by a clamping force which is also applied at three points, i.e., the points of contact with the sides of the V groove and the point of contact with the cap 14. The spherical contacts 12, 16, may easily be replaced by unscrewing bolt 13 and removing cap 14.

While a preferred embodiment has been shown and described, various modifications and substitutions may be made thereto without departing from the spirit and scope of the invention. Accordingly, it is to be understood that the present invention has been described by way of illustration and not limitation.

What is claimed is

1. A contact member for a precision measuring instrument comprising:
    at least a first spherical contact element;
    support means for each said contact element, said support means engaging each said contact element at a plurality of discrete contact points, at least a first of said contact points being disposed diametrically oppositely with respect to the point on the spherical contact element where contact with an object to be measured is to be established, each said contact element being supported so as to extend outwardly beyond the periphery of said support means; and
    means removably attached to said support means for maintaining said discrete point contacts between said contact element and said support means, said removable contact maintaining means engaging each said contact element at a further discrete point of contact.

2. The apparatus of claim 1 wherein said support means engages said spherical contact element at three points.

3. The apparatus of claim 2 wherein said support means comprises:
    a first portion having a first cross-sectional area;
    a second portion having a second cross-sectional area which is less than the cross-sectional area of said first portion, said second portion extending beyond an end of said first portion, the junction of said first and second portions of said support means defining a support shoulder, said second portion of said support means including said first contact point; and
    a V-shaped groove in said support shoulder, the walls of said groove defining second and third points of contact between said support means and each said spherical contact element whereby each said contact element is positioned and supported through establishment of four points of contact therewith.

4. The apparatus of claim 3 wherein said contact maintaining means comprise a removable cap.

5. The apparatus of claim 4 wherein said second portion of said support means is defined by a spacer member.

6. The apparatus of claim 5 wherein said cap is secured to said spacer member and said support means first portion by means of a threaded fastener.

7. The apparatus of claim 4 wherein said cap is secured to said support means by means of a threaded fastener.

8. The apparatus of claim 1 wherein said contact member is linearly moveable and further comprises:
    a second spherical contact element, said second contact element being oppositely disposed with respect to said first contact element, the centers of both contact elements being aligned with a line which is parallel to the path of linear motion of the contact member, said removable contact maintaining means engaging both of said contact elements.

9. The apparatus of claim 8 wherein said support means engages said spherical contact elements at three points of contact.

10. The apparatus of claim 9 wherein said contact maintaining means engages said spherical contact elements at a fourth point of contact whereby each of said contact elements is positioned and supported through establishment of four points of contact therewith.

11. The apparatus of claim 10 wherein said support means comprises:
    a first portion having a first cross-sectional area;
    a second portion having a second cross-sectional area which is less than the cross-sectional area of said first portion, said second portion extending beyond an end of said first portion, the junction of said first and second portions of said support means defining a support shoulder, said second portion of said support means including said first contact point; and
    a V-shaped groove in said support shoulder, the walls of said groove defining second and third points of contact between said support means and said spherical contact elements.

12. The apparatus of claim 11 wherein said contact maintaining means is secured to said support means by means of a threaded fastener.

13. The apparatus of claim 12 wherein said contact maintaining means comprise a removable cap.

14. The apparatus of claim 13 wherein said second portion of said support means is defined by a spacer member.

15. The apparatus of claim 14 herein said cap is secured to said spacer member and said support means first portion by means of a threaded fastener.

16. The apparatus of claim 13 wherein said cap is secured to said support means by means of a threaded fastener.

* * * * *